(12) United States Patent
Nakamura et al.

(10) Patent No.: US 10,862,098 B2
(45) Date of Patent: Dec. 8, 2020

(54) POWER STORAGE DEVICE

(71) Applicant: KABUSHIKI KAISHA TOYOTA JIDOSHOKKI, Kariya (JP)

(72) Inventors: Tomohiro Nakamura, Kariya (JP); Takayuki Hirose, Kariya (JP); Hirokuni Akiyama, Kariya (JP)

(73) Assignee: KABUSHIKI KAISHA TOYOTA JIDOSHOKKI, Kariya (JP)

(*) Notice: Subject to any disclaimer, the term of this patent is extended or adjusted under 35 U.S.C. 154(b) by 215 days.

(21) Appl. No.: 15/779,603

(22) PCT Filed: Dec. 12, 2016

(86) PCT No.: PCT/JP2016/086875
§ 371 (c)(1),
(2) Date: May 29, 2018

(87) PCT Pub. No.: WO2017/110548
PCT Pub. Date: Jun. 29, 2017

(65) Prior Publication Data
US 2018/0351153 A1 Dec. 6, 2018

(30) Foreign Application Priority Data
Dec. 24, 2015 (JP) ................. 2015-251819

(51) Int. Cl.
| H01M 2/34 | (2006.01) |
| H01G 11/78 | (2013.01) |
| H01G 11/74 | (2013.01) |
| H01G 11/76 | (2013.01) |
| H01M 2/06 | (2006.01) |
| H01G 11/82 | (2013.01) |
| H01G 11/16 | (2013.01) |
| H01M 2/26 | (2006.01) |
| H01G 9/00 | (2006.01) |
| H01G 9/008 | (2006.01) |
| H01G 9/048 | (2006.01) |
| H01M 2/02 | (2006.01) |
| H01M 2/04 | (2006.01) |
| H01M 10/0525 | (2010.01) |
| H01M 10/0585 | (2010.01) |
| H01G 9/08 | (2006.01) |

(52) U.S. Cl.
CPC .......... *H01M 2/345* (2013.01); *H01G 9/0003* (2013.01); *H01G 9/008* (2013.01); *H01G 9/048* (2013.01); *H01G 11/16* (2013.01); *H01G 11/74* (2013.01); *H01G 11/76* (2013.01); *H01G 11/78* (2013.01); *H01G 11/82* (2013.01); *H01M 2/024* (2013.01); *H01M 2/043* (2013.01); *H01M 2/0473* (2013.01); *H01M 2/0482* (2013.01); *H01M 2/06* (2013.01); *H01M 2/266* (2013.01); *H01M 10/0525* (2013.01); *H01M 10/0585* (2013.01); *H01G 9/08* (2013.01); *H01M 2220/20* (2013.01)

(58) Field of Classification Search
CPC ........ H01G 2/14; H01G 9/0003; H01G 9/008; H01G 9/048; H01G 9/08; H01G 11/16; H01G 11/74; H01G 11/76; H01G 11/78; H01G 11/82; H01M 2/024; H01M 2/043; H01M 2/0473; H01M 2/0482; H01M 2/06; H01M 2/345; H01M 10/0525; H01M 10/0585; H01M 2220/20
See application file for complete search history.

(56) References Cited

U.S. PATENT DOCUMENTS

2014/0120396 A1* 5/2014 Kajiwara .......... H01M 10/0431
429/94
2016/0308190 A1 10/2016 Okuda et al.

FOREIGN PATENT DOCUMENTS

| JP | 2012-119183 A | 6/2012 |
| JP | 2013-161757 A | 8/2013 |
| JP | 2014-107147 A | 6/2014 |
| JP | 2014-127284 A | 7/2014 |
| JP | 2015-095370 A | 5/2015 |
| JP | 2015-115267 A | 6/2015 |
| JP | 2015-167085 A | 9/2015 |
| KR | 10-0880385 B1 | 1/2009 |
| WO | WO 2015/087721 * | 6/2015 |

OTHER PUBLICATIONS

International Search Report for PCT/JP2016/086875 dated Jan. 17, 2017 [PCT/ISA/210].
International Preliminary Report on Patentability with a Translation of Written Opinion issued from the International Bureau in counterpart International Application No. PCT/JP2016/086875, dated Jun. 26, 2018.

* cited by examiner

*Primary Examiner* — Anca Eoff
(74) *Attorney, Agent, or Firm* — Sughrue Mion, PLLC

(57) ABSTRACT

A power storage device includes an electrode assembly, a case, first and second electrode terminals, and a current interrupting mechanism. The current interrupting mechanism interrupts a current through an electrical current-carrying path when the internal pressure of the case reaches a preset pressure. The current interrupting mechanism includes a mechanism insulating portion, which insulates the first electrode terminal including the current interrupting mechanism from an end face of the electrode assembly, and a terminal insulating portion, which insulates the second electrode terminal from the end face of the electrode assembly. The projecting dimension from a wall portion to the mechanism insulating portion including the first electrode terminal is equal to the projecting dimension from the wall portion to the terminal insulating portion including the second electrode terminal.

10 Claims, 6 Drawing Sheets

POWER STORAGE DEVICE

CROSS REFERENCE TO RELATED APPLICATIONS

This application is a National Stage of International Application No. PCT/JP2016/086875 filed Dec. 12, 2018, claiming priority based on Japanese Patent Application No. 2015-251819 filed Dec. 24, 2015.

TECHNICAL FIELD

The present invention relates to a power storage device having a current interrupting mechanism that interrupts a current in the current-carrying path by deformation of a deformation plate when the internal pressure of the case reaches a preset pressure.

BACKGROUND ART

Conventionally, vehicles such as electric vehicles (EV) and plug-in hybrid vehicles (PHV) are equipped with power storage devices such as lithium-ion rechargeable batteries and nickel-metal hydride rechargeable batteries. The power storage device stores electric power to be supplied to electrical components such as an electric motor. Generally, a rechargeable battery includes an electrode assembly and a case. The electrode assembly has positive electrodes and negative electrodes, which each have active material layers and are stacked in layers. The case accommodates the electrode assembly. One type of case has a case member with an opening configured to allow insertion of the electrode assembly, and a lid member configured to close the opening of the case member. Tabs project from one side of the positive electrodes and the negative electrodes, and conductive members of respective polarities are joined to the tabs. Electrode terminals of respective polarities are electrically connected to the conductive members, and each electrode terminal is fixed to the lid member.

Some rechargeable batteries have a current interrupting mechanism, which interrupts a current in response to an increase in the internal pressure of the case. The current interrupting mechanism is provided on the current-carrying path that electrically connects the electrode terminal of one polarity to the electrode assembly (for example, see Patent Document 1). In the rechargeable battery of Patent Document 1, the current interrupting mechanism is integrated with the positive electrode terminal and is arranged in a space defined between the inner surface of the lid member and the end face of the electrode assembly that faces the inner surface. Such a current interrupting mechanism can also be employed in a rechargeable battery with an electrode assembly with tabs by being arranged in a current-carrying path between an electrode terminal and the electrode assembly.

PRIOR ART DOCUMENT

Patent Document

Patent Document 1: Japanese Laid-Open Patent Publication No. 2012-119183

SUMMARY OF THE INVENTION

Problems that the Invention is to Solve

The positive electrode terminal and the negative electrode terminal are made of different materials. The positive electrode terminal and the negative electrode terminal thus have different electric resistances and strengths from each other. Therefore, in order to reduce the difference in electric resistance and strength between the electrode terminals, the electrode terminals are formed to have different shapes and dimensions. As a result, the distance from the positive electrode terminal to the electrode assembly is different from the distance from the negative electrode terminal to the electrode assembly.

When a current interrupting device is employed in a rechargeable battery, the device is arranged at one of the electrode terminals. For example, if the current interrupting device is arranged at the positive electrode terminal, the members constituting a current-carrying path are located between the electrode assembly and the positive electrode terminal. The members have portions projecting toward the electrode assembly. The distance from the portion of the members closest to the electrode assembly to the electrode assembly may be different from the distance from the negative electrode terminal to the electrode assembly. Even when the current interrupting device is arranged at the negative electrode terminal, the distance from the portion of the device closest to the electrode assembly to the electrode assembly may be different from the distance from the positive electrode terminal to the electrode assembly.

Therefore, when the rechargeable battery is vibrated and the electrode assembly approaches the lid member due to deformation of the tabs, a part of the end face of the electrode assembly locally contacts the current interrupting mechanism.

Accordingly, it is an objective of the present invention to provide a power storage device capable of restricting local contact with an electrode assembly.

Means for Solving the Problems

To achieve the foregoing objective, a power storage device is provided that includes an electrode assembly, in which electrodes of different polarities are stacked while being insulated from each other, a case, which accommodates the electrode assembly, first and second electrode terminals, which are respectively electrically connected to the electrodes of the same polarity and fixed to a wall portion of the case, and a current interrupting mechanism, which is electrically connected to the first electrode terminal. The current interrupting mechanism has a structure that interrupts a current through an electrical current-carrying path between the electrode terminal and the electrode assembly when an internal pressure of the case reaches a preset pressure. The power storage device further includes a mechanism insulating portion, which insulates the first electrode terminal including the current interrupting mechanism from the end face of the electrode assembly, and a terminal insulating portion, which insulates the second electrode terminal from the end face of the electrode assembly. A projecting dimension from the wall portion to the mechanism insulating portion including the first electrode terminal is equal to a projecting dimension from the wall portion to the terminal insulating portion including the second electrode terminal.

With this configuration, the mechanism insulating portion insulates the current interrupting mechanism and the electrode assembly from each other, and the terminal insulating portion insulates the second electrode terminal, at which no current interrupting mechanism is provided, from the electrode assembly. The projecting dimension from the wall portion to the mechanism insulating portion and the projecting dimension from the wall portion to the terminal insulating portion are equal to each other. Thus, even if the power storage device receives an external force or is vibrated so that the electrode assembly approaches the wall portion, the mechanism insulating portion and the terminal insulating portion come into contact with the end face of the electrode assembly in similar manners, and wide contact areas are ensured. This restricts the current interrupting mechanism from locally contacting the end face of the electrode assembly.

The power storage device may further include a pair of conductive members, each of which connects the electrode and the electrode terminal of the same polarity to each other and is arranged between the wall portion and the end face, and a conductive member insulating portion, which insulates the conductive members from the wall portion. The terminal insulating portion and the mechanism insulating portion may be integrated with the conductive member insulating portion.

This configuration, in which the conductive member insulating portion, the terminal insulating portion, and the mechanism insulating portion are integrated, reduces the number of components of the power storage device and facilitate the assembly as compared with a case in which the insulation parts for the conductive members, the insulation parts for the current interrupting mechanism, and the insulation parts for the electrode terminal are provided separately.

The above-described current interrupting mechanism may include a deformation plate, which has one surface on which the internal pressure of the case acts and another surface on which an external pressure of the case acts, constitute a part of the electrical current-carrying path between the first electrode terminal and the electrode assembly, and be arranged between the end face of the electrode assembly and the first electrode terminal.

The power storage device is a rechargeable battery.

Effects of the Invention

The present invention restricts local contact with the electrode assembly.

MODES FOR CARRYING OUT THE INVENTION

A power storage device, which is a rechargeable battery, according to one embodiment will now be described with reference to FIGS. 1 to 9.

Figure 1:
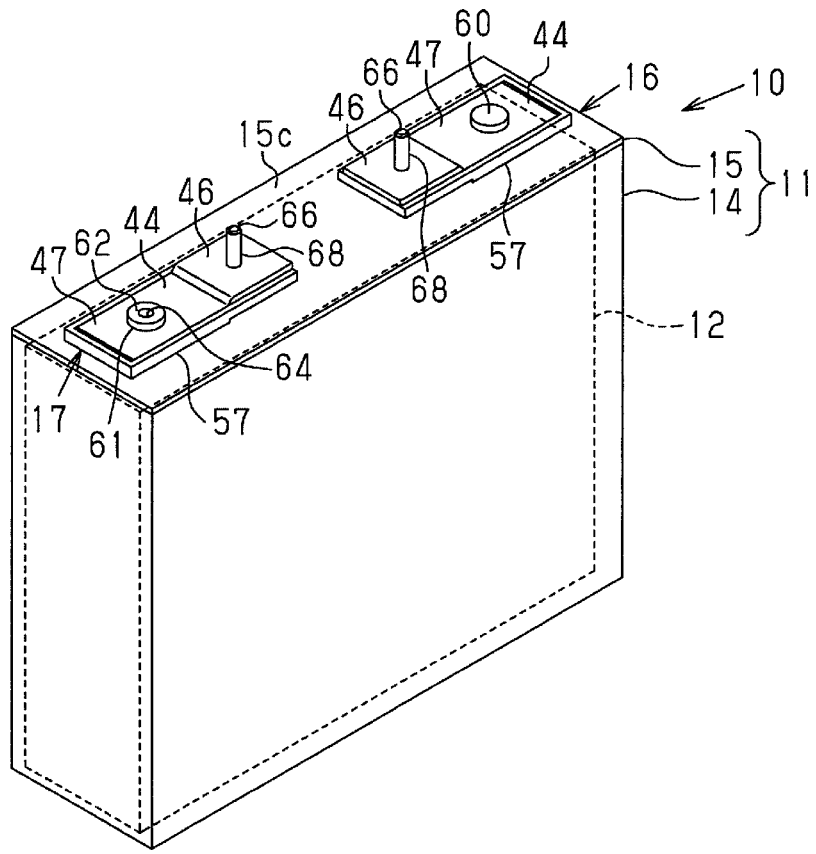
FIG. 1 is a perspective view of a rechargeable battery according to one embodiment.
Figure 3:
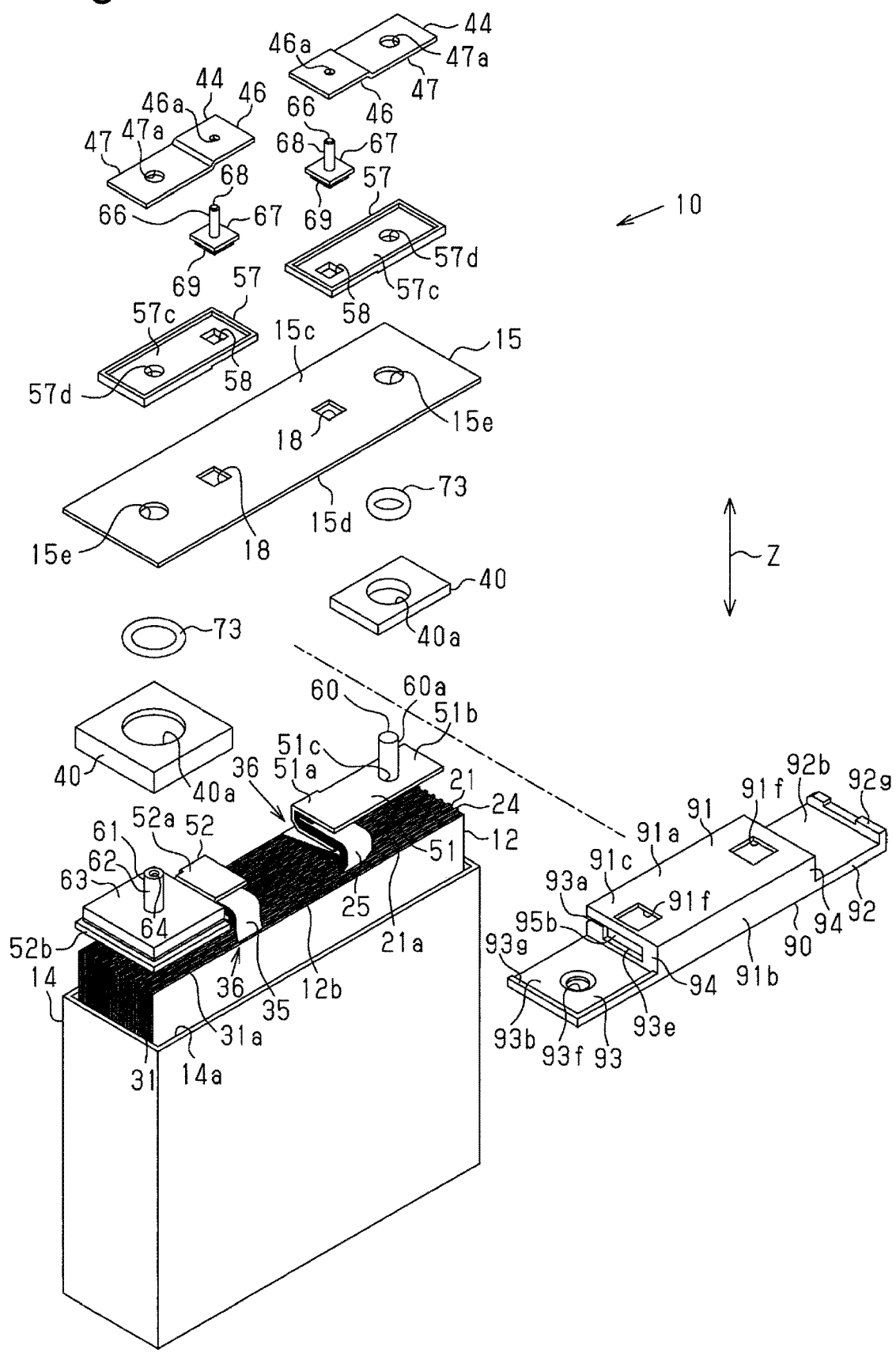
FIG. 3 is an exploded perspective view of the rechargeable battery of the embodiment.

As shown in FIGS. 1 and 3, a power storage device, which is a rechargeable battery 10, includes a case 11 and an electrode assembly 12 accommodated in the case 11. The case 11 has a rectangular box-shaped case member 14 and a lid member 15 as a rectangular flat plate-shaped wall portion that closes an opening 14a of the case member 14. The rechargeable battery 10 of the present embodiment is a lithium-ion battery.

The electrode assembly 12 includes sheet-shaped positive electrodes 21 and sheet-shaped negative electrodes 31. The positive electrodes 21 and the negative electrodes 31 are electrodes having different polarities. Although not illustrated in detail, each positive electrode 21 has a positive electrode foil (an aluminum foil in the present embodiment) and a positive electrode active material layer provided on either side of the positive-electrode foil. Each negative electrode 31 has a negative electrode foil (a copper foil in the present embodiment) and a negative electrode active material layer provided on either side of the negative-electrode foil. The electrode assembly 12 is a stacked type having layers of the positive electrodes 21, the negative electrodes 31, and separators 24. Each separator 24 is located between adjacent ones the positive electrodes 21 and the negative electrodes 31 to insulate them from each other.

Each positive electrode 21 has a tab 25 having a shape projecting from a part of one side 21a of the positive electrode 21. Each negative electrode 31 has a tab 35 having a shape projecting from a part of one side 31a of the negative electrode 31. The positive-electrode tabs 25 and the negative-electrode tabs 35 are provided at positions where the positive-electrode tabs 25 and the negative-electrode tabs 35 do not overlap each other when the positive electrodes 21 and the negative electrodes 31 are stacked respectively. The electrode assembly 12 has a tab-side end face 12b, which is formed by gathering the sides 21a of the positive electrodes 21, the sides 31a of the negative electrodes 31, and the corresponding sides of the separators 24. The positive electrodes 21, which constitute the electrode assembly 12, are stacked such that the respective tabs 25 are arranged in a row in the stacking direction. Likewise, the negative electrodes 31, which constitute the electrode assembly 12, are stacked such that the respective tabs 35 are arranged in a row in the stacking direction.

The rechargeable battery 10 has a positive-electrode tab bundle 36, which projects from the tab-side end face 12b. The positive-electrode tab bundle 36 is constituted by gathering and stacking all the positive-electrode tabs 25 on one side in the stacking direction of the electrode assembly 12. The rechargeable battery 10 also has a negative-electrode tab bundle 36, which projects from the tab-side end face 12b. The negative-electrode tab bundle 36 is constituted by gathering and stacking all the negative-electrode tabs 35 on one side in the stacking direction of the electrode assembly 12. In the rechargeable battery 10, the inner surface of the lid member 15, which is the wall portion of the case 11, faces the tab bundles 36 accommodated in the case 11 and the tab-side end face 12b of the electrode assembly 12. The direction connecting the inner surface of the lid member 15 and the tab-side end face 12b of the electrode assembly 12 by the shortest distance is defined as a facing direction Z.

Figure 4:
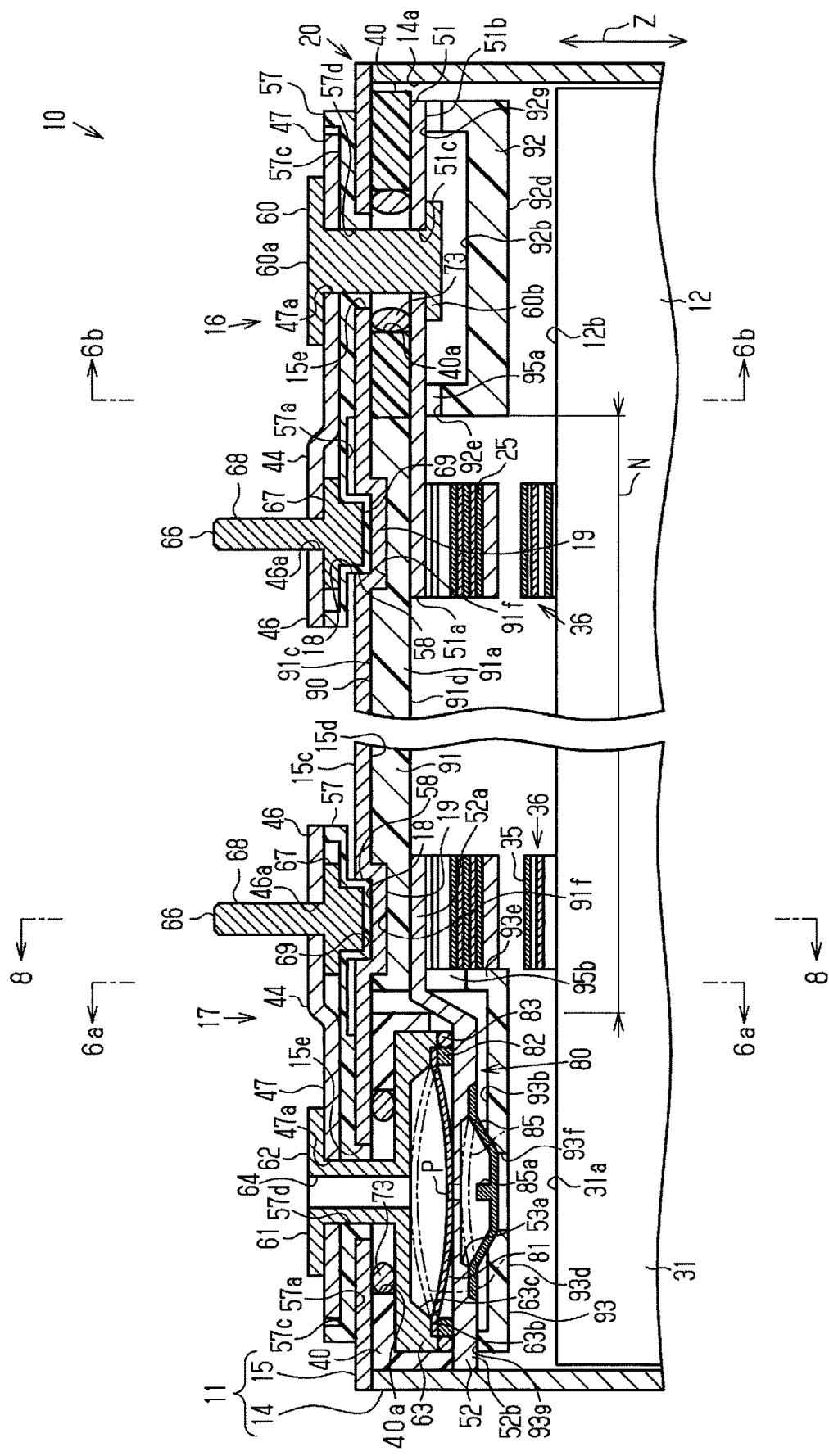
FIG. 4 is a partial cross-sectional view illustrating the rechargeable battery of the embodiment.

As shown in FIGS. 3 and 4, a positive-electrode conductive member 51, which is configured to electrically connect the electrode assembly 12 to a positive terminal structure 16 discussed below, is joined to the positive-electrode tab bundle 36. In addition, a negative-electrode conductive member 52, which is configured to electrically connect the electrode assembly 12 to a negative terminal structure 17 discussed below, is joined to the negative-electrode tab bundle 36. The positive-electrode conductive member 51 and the negative-electrode conductive member 52 are arranged between the inner surface of the lid member 15 and the tab-side end face 12b of the electrode assembly 12.

The positive-electrode conductive member 51 has, on one side in the longitudinal direction, a substantially U-shaped tab joint portion 51a, which is joined to the tab bundle 36. In addition, the positive-electrode conductive member 51 has a flat plate-shaped terminal connecting portion 51b on the other side in the longitudinal direction. The terminal connecting portion 51b is connected to a positive lead terminal 60, which will be discussed below. The tab joint portion 51a and the terminal connecting portion 51b are continuous in the longitudinal direction.

The negative-electrode conductive member 52 has, on one side in the longitudinal direction, a substantially U-shaped tab joint portion 52a, which is electrically joined to the tab bundle 36. In addition, the negative-electrode conductive member 52 has a terminal connecting portion 52b on the other side in the longitudinal direction. The terminal connecting portion 52b is electrically joined to a negative lead terminal 61, which will be discussed below. The tab joint portion 52a and the terminal connecting portion 52b are continuous in the longitudinal direction.

Next, the positive terminal structure 16 and the negative terminal structure 17 will be described. Since the positive terminal structure 16 and the negative terminal structure 17 basically have the same configuration except for the current interrupting mechanism, the same members will be explained using the same reference numerals.

First, the configuration of the lid member 15, which is used to provide the positive terminal structure 16 and the negative terminal structure 17, will be described. The lid member 15 has an outer surface 15c facing the outside of the case 11 and an inner surface 15d facing the inside of the case 11. In the lid member 15, the direction connecting the outer surface 15c and the inner surface 15d by the shortest distance is defined as a thickness direction.

The lid member 15 has locking recesses 18 on both sides in the longitudinal direction. Each locking recess 18 is recessed from the outer surface 15c in the thickness direction. When viewed from the outer surface 15c of the lid member 15, each locking recess 18 has a rectangular outer shape. The lid member 15 has projecting portions 19 projecting from the inner surface 15d. Each projecting portion 19 has a shape projecting from the inner surface 15d by recessing the corresponding locking recess 18 and has a rectangular outer shape. The lid member 15 has insertion holes 15e each located on the outer side of each locking recess 18 in the longitudinal direction.

The positive terminal structure 16 and the negative terminal structure 17 each have an outer insulating member 57 arranged on the outer surface 15c of the lid member 15. The outer insulating members 57 insulate a positive-electrode external connection terminal 66 and the positive lead terminal 60 from the lid member 15 and insulate a negative-electrode external connection terminal 66 and the negative lead terminal 61 from the lid member 15. The outer insulating members 57 are made of plastic. The outer insulating members 57 each have a rectangular shape when viewed from the outer surface 15c of the lid member 15. The direction connecting a front side 57c and a back side 57a of the outer insulating member 57 is defined as a thickness direction.

Each outer insulating member 57 has a rotation prevention portion 58, which projects in the thickness direction from the back side 57a, in a position near one end in the longitudinal direction. The rotation prevention portion 58 has a shape projecting like a rectangular hole from the front side 57c toward the back side 57a. The rectangular shape formed by connecting the four outer side faces of the rotation prevention portion 58 is similar to the rectangular shape formed by connecting the four inner side faces of the locking recess 18 of the lid member 15. Each outer insulating member 57 is installed in the lid member 15 with the rotation prevention portion 58 inserted in the corresponding locking recess 18. The four outer side faces of each rotation prevention portion 58 contact and are locked by the four inner side faces of the corresponding locking recess 18. This contact restricts movement of the outer insulating member 57 in the direction along the outer surface 15c of the lid member 15, in particular, rotation on the outer surface 15c. Each outer insulating member 57 has an insertion hole 57d near the end opposite to the rotation prevention portion 58 in the longitudinal direction. The insertion hole 57d is in a position aligned with the corresponding insertion hole 15e of the lid member 15.

The positive terminal structure 16 and the negative terminal structure 17 each have an external connection terminal 66 arranged outside the lid member 15. The external connection terminals 66 can fix a bus bar outside the lid member 15. The external connection terminals 66 are made of metal. Each external connection terminal 66 includes a prismatic bolt head 67, a shank 68, which has a shape projecting from one end face of the bolt head 67 in the axial direction of the external connection terminal 66, and an engagement protuberance 69, which projects from the other end face of the bolt head 67. A nut for fastening a bus bar can be screwed to the shank 68.

Each engagement protuberance 69 has a rectangular shape as viewed in the axial direction. The rectangular shape formed by connecting the four outer side faces of the engagement protuberance 69 is similar to the rectangular shape formed by connecting the four inner side faces of the rotation prevention portion 58 of the outer insulating member 57. The engagement protuberance 69 of each external connection terminal 66 is inserted in the rotation prevention portion 58 of the corresponding outer insulating member 57. The four outer side faces of the engagement protuberance 69 are in contact with the four inner side faces of the rotation prevention portion 58. This contact restricts movement of the external connection terminal 66 in the direction along the front side 57c of the outer insulating member 57, in particular, rotation on the front side 57c of the outer insulating member 57.

The positive terminal structure 16 has the positive lead terminal 60 as an electrode terminal that is electrically connected to the positive-electrode tab bundle 36 of the electrode assembly 12 via the positive-electrode conductive member 51. The negative terminal structure 17 has the negative lead terminal 61 as an electrode terminal that is electrically connected to the negative-electrode tab bundle 36 of the electrode assembly 12 via the negative-electrode conductive member 52.

The positive lead terminal 60 includes a connecting shaft portion 60a, which is electrically connected to a terminal connecting member 44 discussed below, and a base portion 60b, which is electrically connected to the terminal connecting portion 51b of the positive-electrode conductive member 51. The connecting shaft portion 60a and the base portion 60b are continuous in the axial direction. The terminal connecting member 44 has a connecting piece 46, which is connected to the external connection terminal 66, on one side in the longitudinal direction and a fixed piece 47 on the other side in the longitudinal direction. The terminal connecting member 44 has a through-hole 46a, which extends through the connecting piece 46 in the thickness direction, and the shank 68 of the external connection terminal 66 is passed through the through-hole 46a. Further, the terminal connecting member 44 includes an insertion hole 47a, which extends through the fixed piece 47 in the thickness direction.

The base portion 60b of the positive lead terminal 60 projects from the inner surface 15d of the lid member 15 into the case 11, and the connecting shaft portion 60a extends through the insertion hole 51c of the positive-electrode conductive member 51, an insertion hole 40a of an inner insulating member 40 (discussed below), the insertion hole 15e of the lid member 15, the insertion hole 57d of the outer insulating member 57, and the insertion hole 47a of the terminal connecting member 44.

The positive terminal structure 16 has an O-ring 73, which receives the connecting shaft portion 60a of the positive lead terminal 60 and is supported by the terminal connecting portion 51b of the positive-electrode conductive member 51. Also, the positive terminal structure 16 has the aforementioned inner insulating member 40, through which the connecting shaft portion 60a is passed. The inner insulating member 40 has a rectangular plate shape. The dimension of the inner insulating member 40 in the transverse direction of the lid member 15 is greater than the dimension of the positive-electrode conductive member 51 in the transverse direction of the lid member 15. Therefore, the inner insulating member 40 projects more than the positive-electrode conductive member 51 in the transverse direction of the lid member 15.

As shown in FIG. 4, the O-ring 73, which is supported by the terminal connecting portion 51b, is arranged inside the inner insulating member 40. The inner insulating member 40 is arranged between the lid member 15 and the terminal connecting portion 51b to restrict contact between the lid member 15 and the terminal connecting portion 51b and insulate the lid member 15 and the positive-electrode conductive member 51 from each other.

The distal end of the connecting shaft portion 60a, which extends through the insertion hole 47a of the terminal connecting member 44, is upset in the axial direction so that the connecting shaft portion 60a and the base portion 60b hold in between the positive-electrode conductive member 51, the inner insulating member 40, the lid member 15, the outer insulating member 57, and the fixed piece 47 of the terminal connecting member 44. By this holding action, the positive lead terminal 60 is fixed to the lid member 15. The O-ring 73 is in close contact with the periphery of the insertion hole 15e of the inner surface 15d of the lid member 15 to seal the insertion hole 15e of the lid member 15.

The distal end of the connecting shaft portion 60a of the positive lead terminal 60 is locked to the surface of the fixed piece 47 of the terminal connecting member 44 such that the positive lead terminal 60 and the terminal connecting member 44 are electrically connected to each other. Also, the base portion 60b of the positive lead terminal 60 is in contact with the terminal connecting portion 51b of the positive-electrode conductive member 51 such that the positive lead terminal 60 and the positive-electrode conductive member 51 are electrically connected to each other.

In the negative terminal structure 17, the negative lead terminal 61 includes a connecting shaft portion 62, which is electrically connected to a negative-electrode terminal connecting member 44, and a base portion 63, which is electrically connected to the terminal connecting portion 52b of the negative-electrode conductive member 52. The connecting shaft portion 62 and the base portion 63 are continuous in the axial direction. The connecting shaft portion 62 of the negative lead terminal 61 is passed through the insertion hole 40a of the inner insulating member 40, the insertion hole 15e of the lid member 15, the insertion hole 57d of the outer insulating member 57, and the insertion hole 47a of the terminal connecting member 44.

The base portion 63 of the negative lead terminal 61 has the shape of a rectangular pillar. The outer shape of the base portion 63 is rectangular when the negative lead terminal 61 is viewed in the axial direction. The negative lead terminal 61 has an axial hole 64, which extends through the negative lead terminal 61 in the axial direction, and the axial hole 64 extends through the connecting shaft portion 62 and the base portion 63. The negative lead terminal 61 has a terminal end face 63b and a recess 63c. The terminal end face 63b is located on the end face facing the tab-side end face 12b of the electrode assembly 12 in the base portion 63. The recess 63c is recessed toward the connecting shaft portion 62 from the terminal end face 63b. The recess 63c communicates with the axial hole 64. The terminal end face 63b is annular and surrounds the recess 63c.

The negative terminal structure 17 has an O-ring 73, which receives the connecting shaft portion 62 and is supported by the base portion 63. The negative terminal structure 17 has an inner insulating member 40, through which the connecting shaft portion 60a is passed. The O-ring 73, which is supported by the base portion 63, is arranged inside the inner insulating member 40. The inner insulating member 40 is arranged between the lid member 15 and the base portion 63 of the negative lead terminal 61 to restrict contact between the lid member 15 and the base portion 63 and insulate the lid member 15 and the negative lead terminal 61 from each other. The negative-electrode inner insulating member 40 covers the outer circumferential surface of the base portion 63 and insulates the negative lead terminal 61 from the case 11.

In the negative terminal structure 17, the distal end of the connecting shaft portion 62, which extends through the insertion hole 47a of the terminal connecting member 44, is upset in the axial direction so that the connecting shaft portion 62 and the base portion 63 hold in between the inner insulating member 40, the lid member 15, the outer insulating member 57, and the terminal connecting member 44. By this holding action, the negative lead terminal 61 is fixed to the lid member 15. The O-ring 73 is in close contact with the periphery of the insertion hole 15e of the inner surface 15d of the lid member 15 to seal the insertion hole 15e of the lid member 15.

The distal end of the connecting shaft portion 62 of the negative lead terminal 61 is locked to the surface of the fixed piece 47 of the terminal connecting member 44 such that the negative lead terminal 61 and the terminal connecting member 44 are electrically connected to each other.

The rechargeable battery 10 includes a current interrupting mechanism 80, which is electrically connected to the negative lead terminal 61, which is a first electrode terminal. The positive lead terminal 60 is a second electrode terminal. The current interrupting mechanism 80 is arranged inside the case 11. When the internal pressure of the case 11 reaches a preset pressure, the current interrupting mechanism 80 interrupts the current through the current-carrying path electrically connecting the electrode assembly 12 and the negative lead terminal 61 to each other. The current interrupting mechanism 80 is located at the junction between the base portion 63 of the negative lead terminal 61 and the terminal connecting portion 52b of the negative-electrode conductive member 52. The current interrupting mechanism 80 is integrally incorporated in the negative lead terminal 61.

In the present embodiment, the base portion 63 of the negative lead terminal 61 is electrically connected to the negative-electrode conductive member 52 via the current interrupting mechanism 80 and the negative-electrode conductive member 52 is electrically connected to the negative-electrode tab bundle 36. This constitutes the current-carrying path between the electrode assembly 12 and the negative lead terminal 61.

When activated by the gas generated inside the case 11, the current interrupting mechanism 80 interrupts the electrical connection between the base portion 63 of the negative lead terminal 61 and the negative-electrode conductive member 52. That is, the current interrupting mechanism 80 constitutes a part of the current-carrying path when it is not activated and interrupts the current-carrying path when activated by receiving the pressure of the gas generated inside the case 11.

The current interrupting mechanism 80 has a contact plate 81 joined to the terminal connecting portion 52b of the negative-electrode conductive member 52 and the base portion 63. The contact plate 81 is made of a conductive material and has the shape of a bowl that bulges toward the electrode assembly 12. The contact plate 81 covers the recess 63c of the base portion 63 from the side corresponding to the electrode assembly 12. The outer peripheral portion of the contact plate 81 that protrudes from the recess 63c and the terminal end face 63b of the base portion 63 are fixed to each other by welding.

A portion of the contact plate 81 that faces the recess 63c bulges toward the electrode assembly 12 (downward) in the normal state, and this portion bulging toward the electrode assembly 12 and terminal connecting portion 52b of the negative-electrode conductive member 52 are welded to each other. A negative-electrode welded part P, at which the contact plate 81 and the terminal connecting portion 52b are welded together, is used as a conductive portion for conducting the negative lead terminal 61 and the negative-electrode conductive member 52 to each other. Thus, the negative-electrode conductive member 52 and the negative lead terminal 61 are electrically connected to each other via the contact plate 81. The current interrupting mechanism 80 has an insulation ring 82, which is arranged between the base portion 63 and the negative-electrode conductive member 52, and a sealing ring 83, which is arranged on the outer circumference side of the insulation ring 82.

The negative-electrode conductive member 52 has a deformation recess 53a on the surface facing the electrode assembly 12 of the terminal connecting portion 52b. The deformation recess 53a has a conically recessed shape from the electrode assembly 12 toward the lid member 15. The negative-electrode welded part P is located on the bottom surface of the deformation recess 53a. The terminal connecting portion 52b has a breakable groove (not shown) at the bottom portion of the deformation recess 53a. The breakable groove has an annular shape surrounding the negative-electrode welded part P.

The current interrupting mechanism 80 has a deformation plate 85, which is deformed by receiving the internal pressure of the case 11. The deformation plate 85 is a diaphragm made of an elastic material, for example, a metal plate, and is located at a position closer to the electrode assembly 12 than the terminal connecting portion 52b. The deformation plate 85 has the shape of a disk and covers the deformation recess 53a from the side corresponding to the electrode assembly 12. The outer periphery of the deformation plate 85 and the terminal connecting portion 52b are fixed to each other by welding over the entire outer periphery of the deformation plate 85. The deformation plate 85 airtightly separates the inside of the case 11 from the outside of the case 11.

In the normal state, the deformation plate 85 bulges from the side corresponding to the lid member 15 toward the electrode assembly 12 (downward). The deformation plate 85 has a projection 85a projecting toward the lid member 15 in the area in the projection portion that faces the negative-electrode welded part P. The projection 85a is made of an insulating material and faces the negative-electrode welded part P, which is surrounded by the breakable groove.

The internal pressure of the case 11 acts on one surface (the surface facing the electrode assembly 12) of the deformation plate 85. Also, the other surface (the surface facing the lid member 15) of the deformation plate 85 receives the external pressure of the case 11 (substantially equivalent to the atmospheric pressure) via the axial hole 64 of the negative lead terminal 61. The deformation plate 85 is configured such that, when receiving the internal pressure that has reached the preset pressure on the surface facing the electrode assembly 12, the deformation plate 85 is deformed by the pressure and bulges toward the lid member 15.

In the current interrupting mechanism 80, which has the above-described configuration, when the internal pressure of the case 11 reaches the preset pressure, the deformation plate 85 is deformed toward the lid member 15, and the projection 85a breaks the negative-electrode welded part P between the terminal connecting portion 52b and the contact plate 81. As a result, the electrical connection between the negative lead terminal 61 and the negative-electrode conductive member 52 is interrupted, which interrupts the current through the current-carrying path.

Next, an insulation cover 90 in the case 11 will be described.

As shown in FIG. 4, the insulation cover 90 has a conductive member insulating portion 91, which is arranged between, in the facing direction Z, the lid member 15 and the set of the positive-electrode conductive member 51 and the negative-electrode conductive member 52. In addition, the insulation cover 90 includes a mechanism insulating portion 93 and a terminal insulating portion 92. The mechanism insulating portion 93 insulates the negative lead terminal 61, which includes the current interrupting mechanism 80, from the tab-side end face 12b of the electrode assembly 12. The terminal insulating portion 92 insulates the positive lead terminal 60 from the tab-side end face 12b of the electrode assembly 12. The insulation cover 90 is substantially U-shaped in side view in the longitudinal direction.

Figure 5:
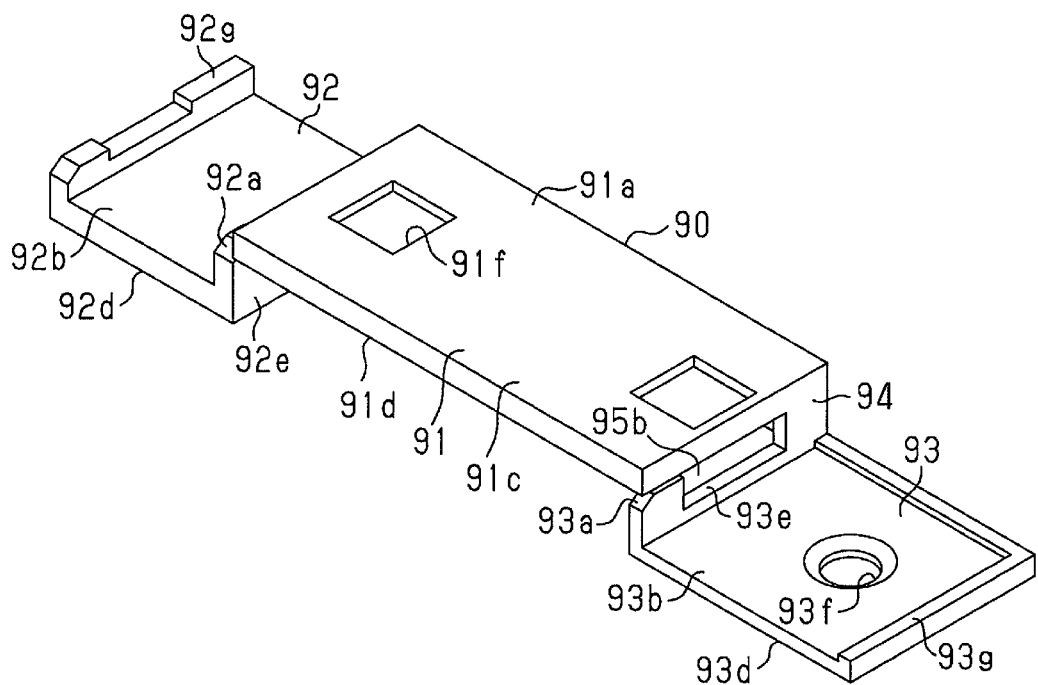
FIG. 5 is a perspective view illustrating the insulation cover.

As shown in FIG. 5, the mechanism insulating portion 93 is integrated with one end in the longitudinal direction of the rectangular conductive member insulating portion 91, and the terminal insulating portion 92 is integrated with the other end in the longitudinal direction of the conductive member insulating portion 91. That is, the conductive member insulating portion 91, the terminal insulating portion 92, and the mechanism insulating portion 93 constitute a single member. The conductive member insulating portion 91 is L-shaped in a side view seen in the longitudinal direction and includes an insulating portion main body 91a and a side wall portion 91b, which has a shape projecting from one long edge of the insulating portion main body 91a toward the electrode assembly 12.

As shown in FIG. 4, in the rechargeable battery 10, if the direction in which the positive-electrode conductive member 51 and the negative-electrode conductive member 52 are arranged is defined as an arrangement direction, the longitudinal direction of the insulation cover 90 extends in the arrangement direction. The dimension of the line connecting the facing surfaces of the two inner insulating members 40 in the arrangement direction is defined as a dimension N. The dimension of the insulation cover 90 in the longitudinal direction of the conductive member insulating portion 91 is slightly longer than the dimension N. Therefore, one of the end faces in the longitudinal direction of the conductive member insulating portion 91 can contact the inner surface of the positive-electrode inner insulating member 40, and the other end face can contact the inner surface of the negative-electrode inner insulating member 40. The dimension in the transverse direction of the conductive member insulating portion 91 is slightly longer than the dimensions in the transverse direction of the tab joint portions 51a, 52a.

The insulating portion main body 91a of the conductive member insulating portion 91 is located between the lid member 15 and tab joint portions 51a, 52a of the positive and negative electrodes in the facing direction Z to insulate the lid member 15 and the tab joint portions 51a, 52a from each other. The side wall portion 91b of the conductive member insulating portion 91 is located between the tab bundles 36 and the inner surface of a long side wall of the case member 14 to insulate the tab bundles 36 from the case member 14.

Figure 8:
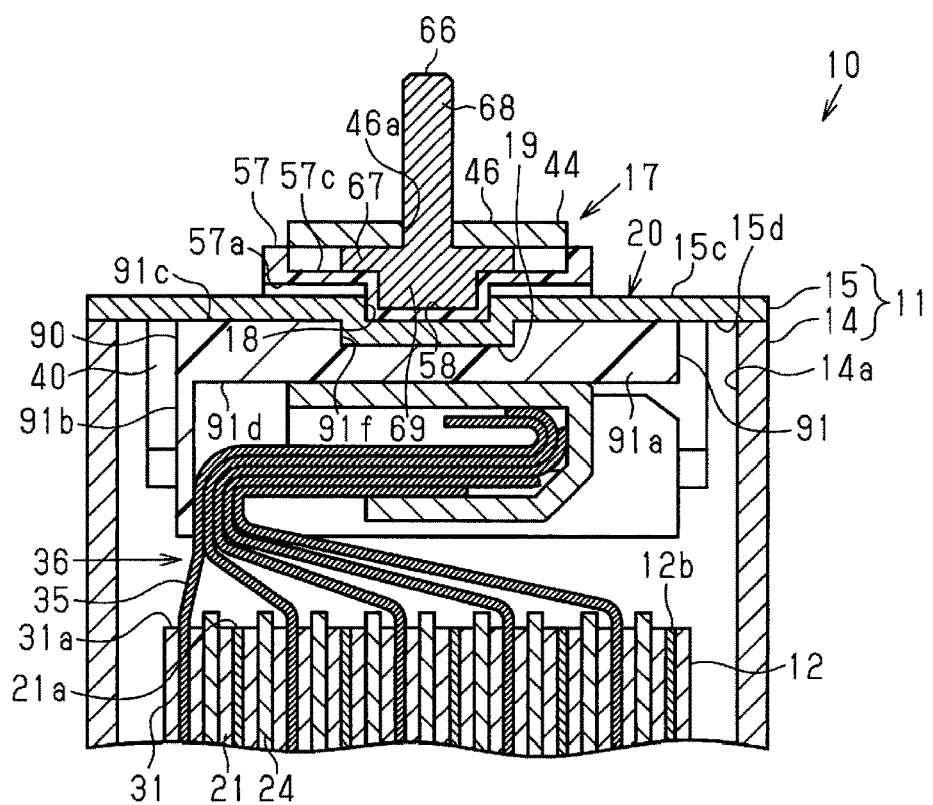
FIG. 8 is a cross-sectional view taken along line 8-8 of FIG. 4, illustrating a region including an external connection terminal.
Figure 9:
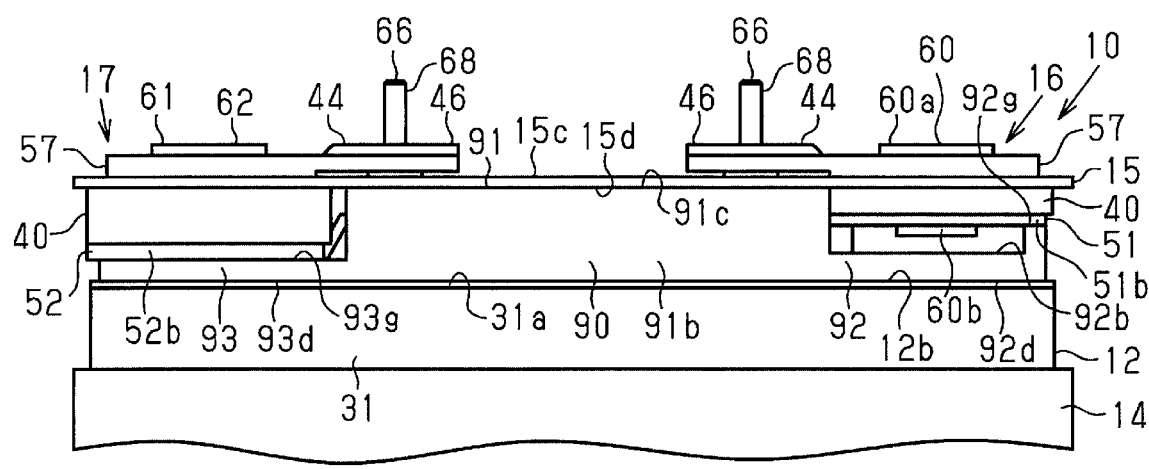
FIG. 9 is a cross-sectional view illustrating a contacting state between the electrode assembly and the insulation cover.

As shown in FIG. 8, the insulation cover 90 has accommodation recesses 91f at both ends in the longitudinal direction of the insulating portion main body 91a. Each accommodation recesses 91f has a quadrangular shape and is recessed from the outer surface 91c of the insulating portion main body 91a toward the electrode assembly 12. Each accommodation recess 91f receives the corresponding the projecting portion 19 of the lid member 15, so that the contact between the outer side faces of the projecting portion 19 and the inner side faces of the accommodation recess 91f restricts movement of the insulation cover 90 in the longitudinal direction and the transverse direction of the insulation cover 90.

As shown in FIG. 5, the insulation cover 90 has coupling portions 94, which are located at the opposite ends in the longitudinal direction of the side wall portion 91b of the conductive member insulating portion 91. The coupling portions 94 are integrated with one end in the transverse direction of the conductive member insulating portion 91. The mechanism insulating portion 93 is coupled to the coupling portion 94 at one end in the longitudinal direction, and the terminal insulating portion 92 is coupled to the coupling portion 94 at the other end in the longitudinal direction of the side wall portion 91b. In the side view in the longitudinal direction, the insulating portion main body 91a and the terminal insulating portion 92 are separated in the facing direction Z from the insulating portion main body 91a and the mechanism insulating portion 93 by the coupling portions 94.

As shown in FIG. 4, in the insulation cover 90, the insulating portion main body 91a has an inner surface 91d on the surface facing the tab-side end face 12b of the electrode assembly 12. The terminal insulating portion 92 has a rectangular shape in a plan view from the outer surface 15c of the lid member 15. The size of the terminal insulating portion 92 in a plan view is larger than the size of the base portion 60b of the positive lead terminal 60 in a plan view and is capable of covering the entire base portion 60b from the side corresponding to the electrode assembly 12.

The terminal insulating portion 92 has an inner surface 92b facing the base portion 60b of the positive lead terminal 60 and an outer surface 92d facing the tab-side end face 12b of the electrode assembly 12. The outer surface 92d is a flat surface. The terminal insulating portion 92 has a protruding portion 92e in a position on the inner surface 92b close to the insulating portion main body 91a, and the protruding portion 92e extends over the entire transverse direction of the insulation cover 90. Also, the protruding portion 92e is located closer to the terminal insulating portion 92 than the insulating portion main body 91a. In the facing direction Z, the insulating portion main body 91a and the protruding portion 92e do not overlap and are offset from each other in the longitudinal direction.

However, in a side view in the longitudinal direction, the insulating portion main body 91a and the protruding portion 92e are located to face each other in the facing direction Z. Therefore, the insulation cover 90 has a positive-side gap 95a between the insulating portion main body 91a and the protruding portion 92e in the facing direction Z. The positive-side gap 95a opens at the end opposite to the coupling portions 94 in the transverse direction of the insulation cover 90. The dimension of the positive-side gap 95a in the facing direction Z is greater than the thickness of the positive-electrode conductive member 51, and the positive-side gap 95a receives the terminal connecting portion 51b. Further, the terminal insulating portion 92 has a rib 92g at the distal end in the longitudinal direction of the insulation cover 90. The rib 92g extends over the entire transverse direction of the insulation cover 90.

The tab joint portion 51a of the positive-electrode conductive member 51 supports the insulating portion main body 91a of the insulation cover 90. The insulating portion main body 91a is held between the tab joint portion 51a, which extends in the facing direction Z, and the lid member 15.

Figure 2:
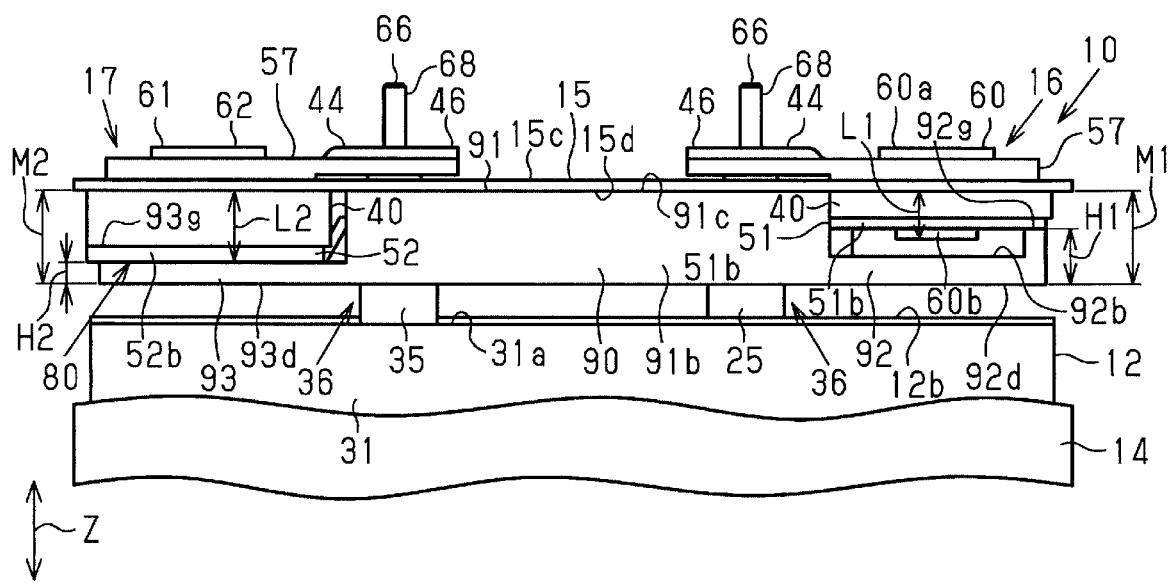
FIG. 2 is a cross-sectional front view, with a part cut away, illustrating the rechargeable battery of the embodiment.

A coupling portion 94 is located at one of the opposite ends of the protruding portion 92e in the transverse direction of the insulation cover 90, and a locking lug 92a is located at the other end of the protruding portion 92e. The locking lug 92a of the terminal insulating portion 92 projects in the facing direction Z from the protruding portion 92e. The dimension in the transverse direction of the insulation cover 90 between the facing surfaces of the coupling portions 94 and the protruding portion 92e is greater than the dimension of the positive-electrode conductive member 51 in the transverse direction and slightly longer than the dimension of the positive-electrode inner insulating member 40. In a state in which the terminal connecting portion 51b is inside the positive-side gap 95a, the coupling portions 94 contact one of the edges of the inner insulating members 40 facing each other in the transverse direction of the insulation cover 90, and the locking lug 92a is locked to the other edge as shown in FIG. 6B. In addition, as shown in FIG. 2, the distal end face of the rib 92g in the facing direction Z is in contact with the surfaces of the inner insulating members 40 that face the electrode assembly 12.

Further, the mechanism insulating portion 93 has a rectangular shape when viewed from the outer surface 15c of the lid member 15. The size in a plan view of the mechanism insulating portion 93 is substantially the same as the sizes in a plan view of the base portion 63 of the negative lead terminal 61 and the current interrupting mechanism 80, so that the entire current interrupting mechanism 80 can be covered from the side corresponding to the electrode assembly 12.

As shown in FIG. 4, the mechanism insulating portion 93 has an inner surface 93b, which faces the deformation plate 85 of the current interrupting mechanism 80, and an outer surface 93d, which faces the electrode assembly 12. The outer surface 93d is a flat surface. The mechanism insulating portion 93 has a protruding portion 93e in a position on the inner surface 93b close to the insulating portion main body 91a, and the protruding portion 93e extends over the entire transverse direction of the insulation cover 90. In the facing direction Z, the insulating portion main body 91a and the protruding portion 93e are in overlapping positions.

The insulation cover 90 has a negative-side gap 95b between the insulating portion main body 91a and the protruding portion 93e in the facing direction Z. The negative-side gap 95b opens at the end opposite to the coupling portions 94 in the transverse direction of the insulation cover 90. The dimension of the negative-side gap 95b in the facing direction Z is greater than the thickness of the tab joint portion 52a of the negative-electrode conductive member 52, and the negative-side gap 95b receives the negative-electrode tab joint portion 52a. The tab joint portion 51a supports the insulating portion main body 91a of the insulation cover 90. The insulating portion main body 91a is held between the tab joint portion 52a, which extends in the facing direction Z, and the lid member 15.

In addition, as shown in FIG. 5, the mechanism insulating portion 93 has a rib 93g along the edge of the inner surface 93b, and this rib 93g is L-shaped in a plan view.

As shown in FIG. 2, the dimension from the outer surface 92d of the terminal insulating portion 92 to the distal end face of the rib 92g is defined as a height H1, the dimension from the outer surface 93d of the mechanism insulating portion 93 to the distal end face of the rib 93g is defined as a height H2. The height H1 of the rib 92g of the terminal insulating portion 92 is greater than the height H2 of the rib 93g of the mechanism insulating portion 93.

Figure 6A:
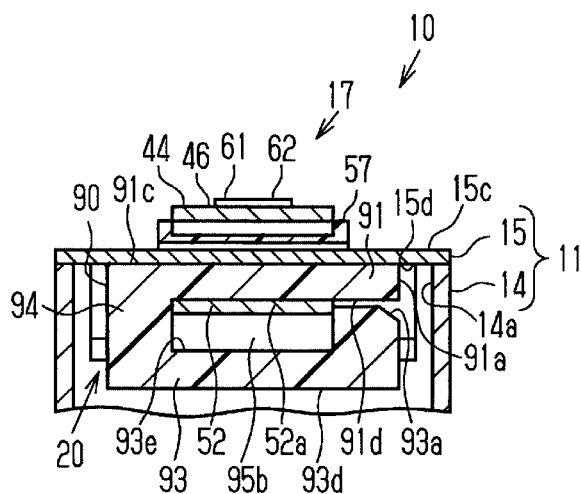
FIG. 6A is a cross-sectional view taken along line 6a-6a in FIG. 4, illustrating the installed state of the insulation cover.
Figure 6B:
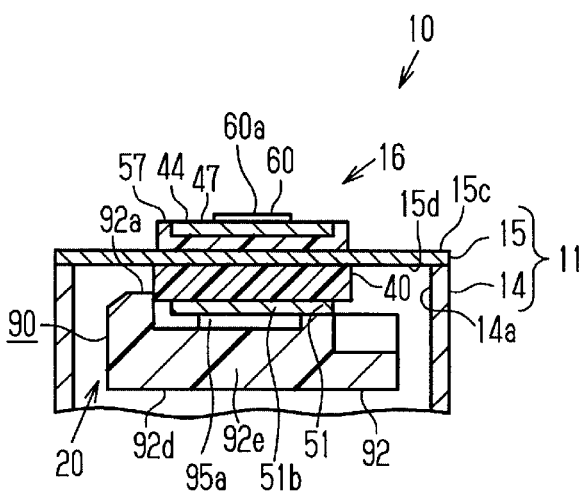
FIG. 6B is a cross-sectional view taken along line 6b-6b in FIG. 4, illustrating the installed state of the insulation cover.

As shown in FIG. 6A, a coupling portion 94 is located at one of the opposite ends of the negative-electrode protruding portion 93e in the transverse direction of the insulation cover 90, and a locking lug 93a is located at the other end of the protruding portion 93e. The locking lug 93a of the mechanism insulating portion 93 projects in the facing direction Z from the protruding portion 93e. The dimension in the transverse direction of the insulation cover 90 between the facing surfaces of the coupling portions 94 and the protruding portion 93e is slightly greater than the dimension in the transverse direction of the tab joint portion 52a. In a state in which the tab joint portion 52a is inside the negative-side gap 95b, the coupling portions 94 contact one of the edges of the tab joint portion 52a facing each other in the transverse direction of the insulation cover 90, and the locking lug 93a is locked to the other edge. In addition, as shown in FIG. 2, the distal end face of the rib 93g in the facing direction Z is in contact with the surface of the terminal connecting portion 52b that faces the electrode assembly 12.

As shown in FIGS. 4 and 5, the mechanism insulating portion 93 has an escape recess 93f, which extends through the thickness in the center portion. The escape recess 93f receives the deformation plate 85 of the current interrupting mechanism 80. The lower surface (the surface facing the electrode assembly 12) of the deformation plate 85 receives the internal pressure of the case 11 via the escape recess 93f.

As shown in FIG. 2, the height H2 from the outer surface 93d to the distal end face of the rib 93g in the mechanism insulating portion 93 is less than the height H1 from the outer surface 92d to the distal end face of the rib 92g in the terminal insulating portion 92. In contrast, the dimension L1 from the inner surface 15d of the lid member 15 to the base portion 60b of the positive lead terminal 60 in the facing direction Z is less than a dimension L2 from the inner surface 15d of the lid member 15 to the terminal connecting portion 52b, which includes the current interrupting mechanism 80. The rib 93g of the mechanism insulating portion 93 contacts the terminal connecting portion 52b, and the rib 92g of the terminal insulating portion 92 contacts the terminal connecting portion 51b of the positive-electrode conductive member 51.

The dimension from the inner surface 15d of the lid member 15 to the outer surface 92d of the terminal insulating portion 92 is defined as a projecting dimension M1 of the positive terminal structure 16. The dimension from the inner surface 15d of the lid member 15 to the outer surface 93d of the mechanism insulating portion 93 is defined as a projecting dimension M2 of the negative terminal structure 17. In this case, the projecting dimension M2 in the negative terminal structure 17 is the same as the projecting dimension M1 in the positive terminal structure 16. The distance between the outer surface 92d of the terminal insulating portion 92 and the tab-side end face 12b of the electrode assembly 12 is equal to the distance between the outer surface 93d of the mechanism insulating portion 93 and the tab-side end face 12b of the electrode assembly 12. The outer surface 92d of the terminal insulating portion 92 is flush with the outer surface 93d of the mechanism insulating portion 93.

In the positive terminal structure 16, the current interrupting mechanism 80 is not integrated with the base portion 60b of the positive lead terminal 60. In contrast, in the negative terminal structure 17, the current interrupting mechanism 80 is integrated into the base portion 63 of the negative lead terminal 61. Therefore, the negative terminal structure 17 projects further toward the electrode assembly 12 from the lid member 15, and the dimension L2 of the negative terminal structure 17 is greater than the dimension L1 of the positive terminal structure 16. However, in the insulation cover 90, the height H2 of the mechanism insulating portion 93 is made less than the height H1 of the terminal insulating portion 92, and the difference in the projecting dimension from the lid member 15 between the positive terminal structure 16 and the negative terminal structure 17 is compensated for by the shape of the insulation cover 90. As a result, the outer surface 93d of the mechanism insulating portion 93 and the outer surface 92d of the terminal insulating portion 92 are flush with each other while the insulation cover 90 covers the current interrupting mechanism 80 from the side corresponding to the electrode assembly 12.

A method for manufacturing the rechargeable battery 10 will now be described.

The contact plate 81 is joined to the terminal end face 63b of the negative lead terminal 61 of the negative electrode, so that the contact plate 81, the insulation ring 82, the sealing ring 83, and the negative-electrode conductive member 52 the (terminal connecting portion 52b) are unitized. Further, the deformation plate 85 is joined to the terminal connecting portion 52b of the negative-electrode conductive member 52, and the negative lead terminal 61, the current interrupting mechanism 80, and the negative-electrode conductive member 52 are integrated in advance.

First, the outer insulating members 57 are placed on the outer surface 15c of the lid member 15 with the rotation prevention portions 58 of the outer insulating members 57 inserted in the locking recesses 18 of the lid member 15. The engagement protuberances 69 of the external connection terminals 66 are inserted in the rotation prevention portions 58 of the outer insulating members 57. The shanks 68 of the external connection terminals 66 are inserted into the through holes 46a of the terminal connecting members 44.

Next, on the side of the positive electrode, an O-ring 73, an inner insulating member 40, and the positive-electrode conductive member 51 are arranged on the inner surface 15d of the lid member 15, and the connecting shaft portion 62 of the positive lead terminal 60 is inserted into the insertion hole 51c of the positive-electrode conductive member 51, the insertion hole 40a of the inner insulating member 40, the O-ring 73, the insertion hole 15e of the lid member 15, and the insertion hole 47a of the terminal connecting member 44. Then, the connecting shaft portion 60a of the positive lead terminal 60 is upset, so that the positive-electrode conductive member 51, the inner insulating member 40, the lid member 15, the outer insulating member 57, and the terminal connecting member 44 are integrated between the base portion 60b and the connecting shaft portion 60a.

On the side of the negative electrode, an O-ring 73 and an inner insulating member 40 are arranged on the inner surface 15d of the lid member 15, and the connecting shaft portion 62 of the negative lead terminal 61 is inserted into the insertion hole 40a of the inner insulating member 40, the O-ring 73, the insertion hole 15e of the lid member 15, and the insertion hole 47a of the terminal connecting member 44. Then, by upsetting the connecting shaft portion 62, the inner insulating member 40, the lid member 15, the outer insulating member 57, and the terminal connecting member 44 are integrated between the base portion 63 and the distal end of the connecting shaft portion 62, and the current interrupting mechanism 80 is also integrated.

The positive terminal structure 16 and the negative terminal structure 17 are thus formed in the lid member 15, and a lid terminal assembly 20 is formed. In the lid terminal assembly 20, rotation of the outer insulating members 57 on the lid member 15 is restricted by the locking between the outer side faces of the rotation prevention portions 58 of the outer insulating members 57 and the inner side faces of the locking recesses 18 of the lid member 15. The rotation of the external connection terminals 66 is restricted by the locking between the inner side faces of the rotation prevention portions 58 of the outer insulating members 57 restricted from rotating and the outer side faces of the engagement protuberances 69 of the external connection terminals 66.

In the lid terminal assembly 20, there is a gap between the lid member 15 and the tab joint portions 51a, 52a in the facing direction Z. Also, the tab joint portions 51a, 52a are L-shaped, and the tab joint portions 51a, 52a have portions projecting from the lid member 15.

The positive-electrode tab bundle 36 of the electrode assembly 12 is joined to the tab joint portion 51a of the positive-electrode conductive member 51 by laser welding, and the negative-electrode tab bundle 36 is joined to the tab joint portion 52a of the negative-electrode conductive member 52 by laser welding. This integrates the lid terminal assembly 20 and the electrode assembly 12.

Figure 7:
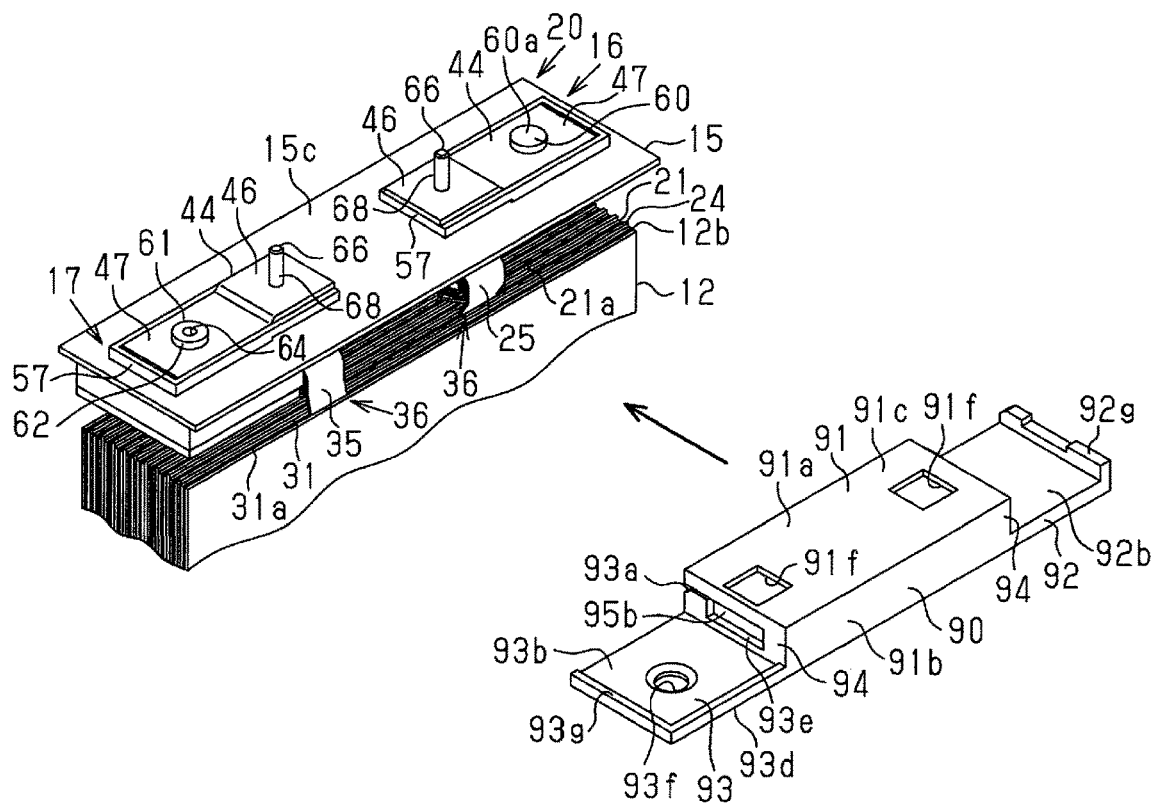
FIG. 7 is a perspective view illustrating the installed state of the insulation cover.

Next, each of the tab joint portions 51a, 52a is bent into a substantially U-shape, and the tab bundles 36 are bent. Then, as shown in FIG. 7, the insulating portion main body 91a of the insulation cover 90 is inserted between the lid member 15 and the tab joint portions 51a, 52a in the facing direction Z, and the insulation cover 90 is slid so that the positive-electrode conductive member 51 and the negative-electrode conductive member 52 are inserted into the positive-side gap 95a and the negative-side gap 95b, respectively.

When the coupling portion 94 contacts one edge of the inner insulating member 40 on the side of the positive electrode, the locking lug 92a of the terminal insulating portion 92 is locked to the edge of the inner insulating member 40. On the side of the negative electrode, when the coupling portion 94 contacts one of the long edges of the tab joint portion 52a, the locking lug 93a of the mechanism insulating portion 93 is engaged with the other long edge of the tab joint portion 52a. As a result, the insulation cover 90 is integrally assembled to the positive-electrode conductive member 51 and the negative-electrode conductive member 52, and the tab joint portions 51a, 52a are insulated from the lid member 15 by the insulating portion main body 91a.

Also, the terminal insulating portion 92 insulates the base portion 60b of the positive lead terminal 60 from the electrode assembly 12, and the mechanism insulating portion 93 insulates the current interrupting mechanism 80 from the electrode assembly 12 while protecting the deformation plate 85.

Then, the electrode assembly 12 is inserted into the case member 14 from the opening 14a of the case member 14. At this time, in order to push the electrode assembly 12 into the case member 14, the lid terminal assembly 20 is pushed toward the case member 14. Accordingly, the electrode assembly 12 is pushed while the outer surface 92d of the terminal insulating portion 92 of the insulation cover 90 and the outer surface 93d of the mechanism insulating portion 93 simultaneously contact the tab-side end face 12b of the electrode assembly 12.

After the electrode assembly 12 is inserted into the case member 14, the lid member 15 is joined to the open end of the case member 14, so that the rechargeable battery 10 is assembled.

The above-described embodiment has the following advantages.

(1) The projecting dimension M1 from the inner surface 15d of the lid member 15 to the outer surface 92d of the terminal insulating portion 92 in the positive terminal structure 16 is equalized with the projecting dimension M2 from the inner surface 15d of the lid member 15 to the outer surface 93d of the mechanism insulating portion 93 in the negative terminal structure 17. Therefore, the electrode assembly 12 may move toward the lid member 15 when the rechargeable battery 10 receives an external force or is vibrated when being charged initially or being used. At this time, the tab-side end face 12b of the electrode assembly 12 contacts both the terminal insulating portion 92 and the mechanism insulating portion 93. Since the terminal insulating portion 92 and the mechanism insulating portion 93 are both plate-shaped, and the outer surfaces 92d, 93d are flat, large contact areas with the tab-side end face 12b are ensured. Therefore, when, for example, the rechargeable battery 10 is vibrated, the current interrupting mechanism 80 is prevented from locally contacting the tab-side end face 12*b* of the electrode assembly 12, so that the tab-side end face 12*b* is unlikely to be damaged.

Further, when the lid terminal assembly 20 and the electrode assembly 12 are integrated and the electrode assembly 12 is inserted into the case member 14, the outer surfaces 92*d*, 93*d* of the terminal insulating portion 92 and the mechanism insulating portion 93 simultaneously contact the tab-side end face 12*b*, which disperses the load applied to the electrode assembly 12. Therefore, when inserting the electrode assembly 12 into the case member 14, the terminal insulating portion 92 and the mechanism insulating portion 93 do not locally contact the tab-side end face 12*b*, and the tab-side end face 12*b* is thus unlikely to be damaged.

(2) The rib 92*g* of the terminal insulating portion 92 contacts the inner insulating member 40 of the positive terminal structure 16, and the rib 93*g* of the mechanism insulating portion 93 contacts the terminal connecting portion 52*b* in the negative terminal structure 17. Thus, the height H1 at the rib 92*g* of the terminal insulating portion 92 can be made greater than the height H2 at the rib 93*g* of the mechanism insulating portion 93. The height difference equalizes the projecting dimension M1 of the positive terminal structure 16 with the projecting dimension M2 of the negative terminal structure 17.

(3) The deformation plate 85 of the current interrupting mechanism 80 is covered by the mechanism insulating portion 93 of the insulation cover 90 from the side corresponding to the electrode assembly 12. Therefore, even if the rechargeable battery 10 receives an external force or is vibrated when being charged initially or being used, the tab-side end face 12*b* of the electrode assembly 12 is restricted from contacting the deformation plate 85, so that the deformation plate 85 is restricted from being deformed. This restricts erroneous operation of the current interrupting mechanism 80.

(4) The insulation cover 90 includes the conductive member insulating portion 91, which insulates the tab joint portion 51*a*, 52*a* from the lid member 15, the terminal insulating portion 92, which insulates the positive lead terminal 60 from the electrode assembly 12, and the mechanism insulating portion 93, which insulates the current interrupting mechanism 80 from the electrode assembly 12. Therefore, as compared with a case in which an insulating member for the tab joint portion 51*a*, 52*a* and the lid member 15, an insulating member for the positive lead terminal 60 and the electrode assembly 12, and an insulating member for the current interrupting mechanism 80 and the electrode assembly 12 are provided separately, the number of components of the rechargeable battery 10 is reduced and the assembly work of the rechargeable battery 10 is facilitated.

(5) The insulation cover 90 includes the accommodation recesses 91*f* at both ends in the longitudinal direction of the insulating portion main body 91*a*, and the projecting portions 19 of the lid member 15 are inserted into the accommodation recesses 91*f*. The projecting portions 19 are portions into which the rotation prevention portions 58 of the outer insulating members 57 are inserted in order to restrict rotation of the outer insulating members 57 on the lid member 15. Therefore, although the rechargeable battery 10 has the projecting portions 19 configured to restrict rotation of the outer insulating members 57 in the lid member 15, the projecting portions 19 do not hamper the installation state of the insulation cover 90.

The above-described embodiment may be modified as follows.

The insulation cover 90 has the conductive member insulating portion 91, the terminal insulating portion 92, and the mechanism insulating portion 93, which are integrated. However, the conductive member insulating portion 91, the terminal insulating portion 92, the mechanism insulating portion 93 may be provided as separate components.

The rib 92*g* of the terminal insulating portion 92 and the rib 93*g* of the mechanism insulating portion 93 may be omitted, and the projecting dimension M1 and the projecting dimension M2 may be equalized by the thicknesses of the terminal insulating portion 92 and the mechanism insulating portion 93.

The insulation cover 90 may have a structure in which the conductive member insulating portion 91 does not exist and the terminal insulating portion 92 and the mechanism insulating portion 93 are integrated.

In the insulation cover 90, the escape recesses 93*f* may be omitted if the mechanism insulating portion 93 is spaced apart in the facing direction from the deformation plate 85 of the current interrupting mechanism 80 to avoid contact.

The power storage device may be employed in a rechargeable battery that includes a current interrupting mechanism 80 that is integrated with a positive lead terminal 60. In this case, the mechanism insulating portion 93 is arranged between the positive lead terminal 60 and the tab-side end face 12*b* of the electrode assembly 12, and the terminal insulating portion 92 is arranged between the negative lead terminal 61 and the tab-side end face 12*b* of the electrode assembly 12. The positive lead terminal 60 corresponds to the first electrode terminal and the negative lead terminal 61 corresponds to the second electrode terminal.

The wall portion may be the side wall of the case member 14 instead of the lid member 15.

The electrode terminals do not necessarily need to be connected via the external connection terminals 66 and the terminal connecting members 44 like the positive lead terminal 60 and the negative lead terminal 61, and may be directly connected to the positive-electrode conductive member 51 and the negative-electrode conductive member 52.

The power storage device is applicable to a power storage device other than a rechargeable battery. The power storage device may be applied to, for example, a capacitor.

Each positive electrode 21 and each negative electrode 31 may include an active material layer only on one side of the foil.

The rechargeable battery 10 may be a lithium-ion rechargeable battery or may be other rechargeable batteries. That is, any configuration may be employed as long as ions move between the positive-electrode active material and the negative-electrode active material, and the positive-electrode active material and the negative-electrode active material supply and receive electric charge.

The technical ideas obtainable from the above embodiments and the modifications are described below.

(1) A power storage device comprising: an electrode assembly, in which electrodes of different polarities are stacked while being insulated from each other;

tab bundles of the respective polarities, which each include stacked tabs of a shape projecting from the electrodes and project from an end face of the electrode assembly;

a case, which accommodates the electrode assembly and the tab bundles;

external connection terminals, which are arranged outside a wall portion of the case;

conductive members, which are arranged between the end face of the electrode assembly and the wall portion and electrically connected to the tab bundles;

lead terminals, which are connected to the conductive members outside the tab bundles in an arrangement direction of the tab bundles and project out from the wall portion;

terminal connecting members, which are arranged outside the wall portion and connect the lead terminals and the external connection terminals to each other; and an insulation cover, which is located between a pair of the conductive members and the wall portion, the power storage device being characterized by locking recesses, which are arranged at parts of the wall portion that overlap the external connection terminals and project toward the insulation cover, wherein the locking recesses restrict rotation of engagement protuberances of the external connection terminals, and the insulation cover includes is accommodation recesses, which accommodate parts that are projected from the wall portion by the locking recesses.

In this configuration, the parts that project from the wall portion are portions configured to restrict rotation of the external connection terminals on the wall portion. Therefore, although the power storage device has structures configured to restrict rotation of the outer connection terminals on the wall portion, those structures do not hamper the installation state of the insulation cover.

(2) The power storage device, wherein the height of the terminal insulating portion is greater than the height of mechanism insulating portion.

DESCRIPTION OF THE REFERENCE NUMERALS

M1, M2 . . . Projecting Dimension; 10 . . . Rechargeable Battery as Power Storage Device; 11 . . . Case; 12 . . . Electrode Assembly; 12*b* . . . Tab-Side End Face; 15 . . . Lid Member as Wall Portion; 21 . . . Positive Electrode; 31 . . . Negative Electrode; 51 . . . Positive-Electrode Conductive member; 52 . . . Negative-Electrode Conductive member; 60 . . . Positive Lead terminal as Second Electrode Terminal; 61 . . . Negative Lead terminal as First Electrode Terminal; 80 . . . Current interrupting mechanism; 85 . . . Deformation Plate; 91 . . . Conductive Member Insulating Portion; 92 . . . Terminal Insulating Portion; 93 . . . Mechanism Insulating Portion.

The invention claimed is:

1. A power storage device comprising:
an electrode assembly, in which electrodes of different polarities are stacked while being insulated from each other;
a case, which accommodates the electrode assembly;
first and second electrode terminals, which are respectively electrically connected to the electrodes of the same polarity and fixed to a wall portion of the case;
a current interrupting mechanism, which is electrically connected to the first electrode terminal,
wherein the current interrupting mechanism has a structure that interrupts a current through an electrical current-carrying path between the electrode terminal and the electrode assembly when an internal pressure of the case reaches a preset pressure,
a mechanism insulating portion, which insulates the first electrode terminal including the current interrupting mechanism from an end face of the electrode assembly;
a terminal insulating portion, which insulates the second electrode terminal from the end face of the electrode assembly,
wherein a projecting dimension from the wall portion to the mechanism insulating portion including the first electrode terminal is equal to a projecting dimension from the wall portion to the terminal insulating portion including the second electrode terminal;
a pair of conductive members, each of which connects the electrode and the electrode terminal of the same polarity to each other and is arranged between the wall portion and the end face; and
a conductive member insulation portion, which insulates the conductive members from the wall portion,
wherein a lower surface of the conductive member insulating portion is flush with a lower surface of the mechanism insulating portion and a lower surface of the terminal insulating portion.

2. The power storage device according to claim 1, wherein the current interrupting mechanism
includes a deformation plate, which has one surface on which the internal pressure of the case acts and another surface on which an external pressure of the case acts,
constitutes a part of the electrical current-carrying path between the first electrode terminal and the electrode assembly, and
is arranged between the end face of the electrode assembly and the first electrode terminal.

3. The power storage device according to claim 1, wherein the power storage device is a rechargeable battery.

4. The power storage device according to claim 1, wherein the terminal insulating portion and the mechanism insulating portion are integrated with the conductive member insulating portion.

5. The power storage device according to claim 1, wherein the pair of conductive members includes:
a negative-electrode conductive member, which is electrically connected to the first electrode terminal; and
a positive-electrode conductive member, which is electrically connected to the second electrode terminal,
wherein
at least a part of the mechanism insulating portion contacts a lower surface of the negative-electrode conductive member, and
at least a part of the terminal insulating portion contacts a lower surface of the positive-electrode conductive member.

6. The power storage device according to claim 1, further comprising tab bundles of the respective polarities, wherein the tab bundles are bent.

7. The power storage device according to claim 1, wherein the terminal insulating portion has a rib.

8. The power storage device according to claim 1, wherein the mechanism insulating portion has a rib.

9. A power storage device comprising:
an electrode assembly, in which electrodes of different polarities are stacked while being insulated from each other;
a case, which accommodates the electrode assembly;
first and second electrode terminals, which are respectively electrically connected to the electrodes of the same polarity and fixed to a wall portion of the case;
a mechanism insulating portion, which insulates the first electrode terminal from an end face of the electrode assembly;

a terminal insulating portion, which insulates the second electrode terminal from the end face of the electrode assembly, wherein a projecting dimension from the wall portion to the mechanism insulating portion including the first electrode terminal is equal to a projecting dimension from the wall portion to the terminal insulating portion including the second electrode terminal;

a pair of conductive members, each of which connects the electrode and the electrode terminal of the same polarity to each other and is arranged between the wall portion and the end face; and a conductive member insulating portion, which insulates the conductive members from the wall portion, wherein a lower surface of the conductive member insulating portion is flush with a lower surface of the mechanism insulating portion and a lower surface of the terminal insulating portion.

10. A power storage device comprising:

an electrode assembly, in which electrodes of different polarities are stacked while being insulated from each other;

a case, which accommodates the electrode assembly;

first and second electrode terminals, which are respectively electrically connected to the electrodes of the same polarity and fixed to a wall portion of the case; and a current interrupting mechanism, which is electrically connected to the first electrode terminal, wherein the current interrupting mechanism has a structure that interrupts a current through an electrical current-carrying path between the electrode terminal and the electrode assembly when an internal pressure of the case reaches a preset pressure, a mechanism insulating portion, which insulates the first electrode terminal including the current interrupting mechanism from an end face of the electrode assembly; and a terminal insulating portion, which insulates the second electrode terminal from the end face of the electrode assembly, wherein a projecting dimension from the wall portion to the mechanism insulating portion including the first electrode terminal is equal to a projecting dimension from the wall portion to the terminal insulating portion including the second electrode terminal, a pair of conductive members, each of which connects the electrode and the electrode terminal of the same polarity to each other and is arranged between the wall portion and the end face; and a conductive member insulating portion, which insulates the conductive members from the wall portion, and wherein the terminal insulating portion and the mechanism insulating portion are integrated with the conductive member insulating portion.

* * * * *